United States Patent
Kolman et al.

(10) Patent No.: US 9,558,346 B1
(45) Date of Patent: Jan. 31, 2017

(54) INFORMATION PROCESSING SYSTEMS WITH SECURITY-RELATED FEEDBACK

(71) Applicant: EMC Corporation, Hopkinton, MA (US)

(72) Inventors: Eyal Kolman, Tel Aviv (IL); Alon Kaufman, Bnei-Dror (IL); Yael Villa, Tel Aviv (IL); Alex Vaystikh, Hod Hasharon (IL); Ereli Eran, Tel-Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 13/903,390

(22) Filed: May 28, 2013

(51) Int. Cl.
  *G06F 21/50* (2013.01)
  *G06F 21/55* (2013.01)
  *G06F 21/51* (2013.01)
  *G06F 21/57* (2013.01)

(52) U.S. Cl.
  CPC .............. *G06F 21/50* (2013.01); *G06F 21/51* (2013.01); *G06F 21/552* (2013.01); *G06F 21/554* (2013.01); *G06F 21/57* (2013.01); *G06F 21/577* (2013.01)

(58) Field of Classification Search
  CPC ..................................................... G06F 21/577
  USPC ............................................................ 726/25
  See application file for complete search history.

(56) References Cited

U.S. PATENT DOCUMENTS

| | | | |
|---|---|---|---|
| 6,295,439 B1* | 9/2001 | Bejar et al. | 434/350 |
| 2006/0253584 A1* | 11/2006 | Dixon | G06Q 30/02 709/225 |
| 2009/0171757 A1* | 7/2009 | Feinstein et al. | 705/10 |
| 2010/0094791 A1* | 4/2010 | Miltonberger | 706/46 |

* cited by examiner

*Primary Examiner* — Jung Kim
*Assistant Examiner* — Ngoc D Nguyen
(74) *Attorney, Agent, or Firm* — Krishnendu Gupta; Jason A. Reyes

(57) ABSTRACT

An information processing system implements a security system. The security system comprises a classifier configured to process information characterizing events in order to generate respective risk scores, and a data store coupled to the classifier and configured to store feedback relating to one or more attributes associated with an assessment of the risk scores by one or more users. The classifier is configured to utilize the feedback regarding the risk scores to learn riskiness of particular events and to adjust its operation based on the learned riskiness, such that the risk score generated by the classifier for a given one of the events is based at least in part on the feedback received regarding risk scores generated for one or more previous ones of the events.

14 Claims, 4 Drawing Sheets

FIG. 3

| ID | Date | Type | Severity | Status | Assignee | Protocol/User Action | Policy | Learned Riskiness |
|---|---|---|---|---|---|---|---|---|
| 13 | 11/10/2011, 04:52 PM | | Low | Open | admin | copymove-netshare | US Social Security Numbers | 1284 |
| 8 | 11/09/2011, 03:00 PM | | Low | Open | admin | copymove-netshare | US Social Security Numbers | 1284 |
| 21 | 11/11/2011, 02:33 PM | | Low | Open | admin | copymove-netshare | US Social Security Numbers | 1284 |
| 11 | 11/09/2011, 04:15 PM | | Low | Open | admin | copymove-netshare | US Social Security Numbers | 1284 |
| 19 | 11/11/2011, 02:33 PM | | High | Open | admin | copymove-netshare | US Social Security Numbers | 570 |
| 12 | 11/09/2011, 04:14 PM | | High | Open | admin | copymove-netshare | US Social Security Numbers | 570 |
| 20 | 11/11/2011, 02:33 PM | | High | Open | admin | copymove-netshare | Credit Card Numbers | -285 |
| 25 | 11/11/2011, 02:41 PM | | High | Open | admin | copymove-netshare | Credit Card Numbers | -285 |
| 30 | 11/11/2011, 03:43 PM | | High | Open | admin | copymove-netshare | Credit Card Numbers | -285 |
| 28 | 11/11/2011, 02:45 PM | | High | Open | admin | copymove-netshare | Credit Card Numbers | -428 |
| 22 | 11/11/2011, 02:36 PM | | High | Open | admin | copymove-netshare | Credit Card Numbers | -428 |
| 24 | 11/11/2011, 02:37 PM | | Critical | Open | admin | copymove-netshare | Credit Card Numbers | -428 |

FIG. 4
SET INCIDENT VALIDITY
Set incident validity: ● Real Issue (the incident is valid)
○ Non Issue (the incident is valid, but not important)
○ False Positive (the incident is not valid)
Comment:
[Save] [Cancel]
FIG. 5
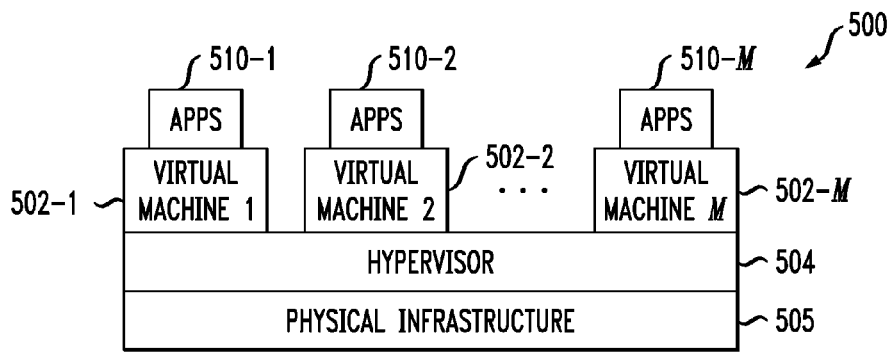
FIG. 6
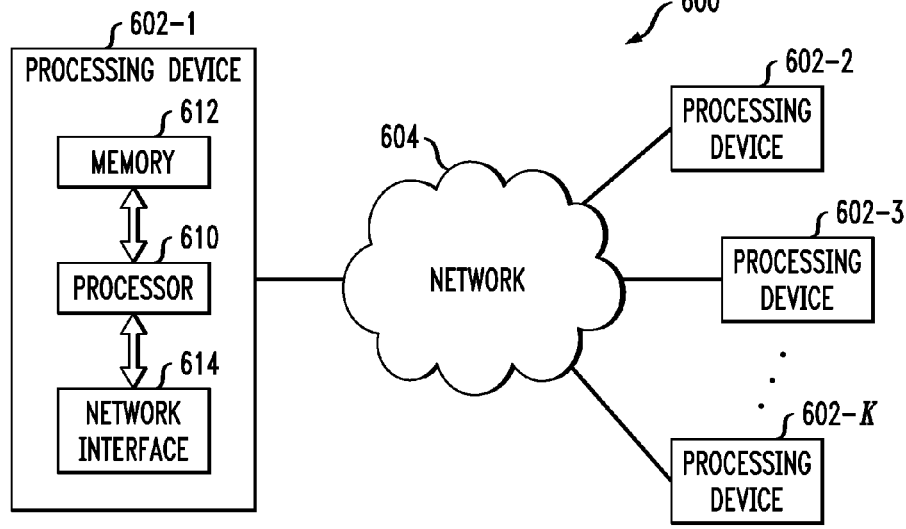

INFORMATION PROCESSING SYSTEMS WITH SECURITY-RELATED FEEDBACK

TECHNICAL FIELD

The field relates generally to information processing systems, and more particularly to techniques for implementing data loss prevention and other type of security protections in such systems.

BACKGROUND OF THE INVENTION

Many different types of products are utilized to provide security protections in information processing systems. For example, conventional products can detect the occurrence of security-related events such as firewalls being accessed, customer data being sent outside of a company, malware files being downloaded, or security policy violations. A given such product is typically implemented in software and configured to alert a security operator or other user upon detection of particular events. The number of reported events can be very large in practice. However, the user generally has only finite resources available for further investigation of the reported events.

Accordingly, when security-related events are reported to the user, the user must select which ones to spend time investigating. The user will then focus on the selected events in order to determine the appropriate remediation actions, if any, that should be taken in response to those events.

In conventional practice, the decision on which events to select for further investigation may be based primarily on static rules that are hard-coded into the product and provide the user with an indication of a perceived threat associated with the event. For example, the product may specify a severity level for each detected event, from a range of levels such as low, medium, high and critical severity levels.

This static rules approach to determining the severity of a security-related event has a number of significant drawbacks. For example, such an approach is unable to adapt to a changing system environment, and can lead to incorrect evaluations for environments that are different than expected. As a result, the user may require that a custom fix be made to the product, which increases its cost and complexity. In addition, the static rules approach does not take sufficient account of information regarding the particular manner in which the product is implemented and utilized by the user.

SUMMARY OF THE INVENTION

There is disclosed an apparatus comprising: at least one processing device comprising a processor coupled to a memory and implementing a security system, the security system comprising: a classifier configured to process information characterizing the events in order to generate respective risk scores; and a data store coupled to the classifier and configured to store feedback relating to one or more attributes associated with an assessment of the risk scores by one or more users; wherein the classifier is configured to utilize the feedback regarding the risk scores to learn riskiness of particular events and to adjust its operation based on the learned riskiness, such that the risk score generated by the classifier for a given one of the events is based at least in part on the feedback received regarding risk scores generated for one or more previous ones of the events.

There is also disclosed a method comprising the steps of: processing information characterizing security-related events in order to generate respective risk scores; receiving feedback relating to one or more attributes associated with an assessment of the risk scores by one or more users; and utilizing the feedback regarding the risk scores to learn riskiness of particular events, such that the risk score generated for a given one of the events is based at least in part on the feedback received regarding risk scores generated for one or more previous ones of the events.

There is further disclosed an information processing system comprising: information technology infrastructure; a security operations center associated with the information technology infrastructure and comprising a security system, the security system comprising: a classifier configured to process information characterizing the events in order to generate respective risk scores; and a data store coupled to the classifier and configured to store feedback relating to one or more attributes associated with an assessment of the risk scores by one or more users; wherein the classifier is configured to utilize the feedback regarding the risk scores to learn riskiness of particular events and to adjust its operation based on the learned riskiness, such that the risk score generated by the classifier for a given one of the events is based at least in part on the feedback received regarding risk scores generated for one or more previous ones of the events.

BRIEF DESCRIPTION OF THE DRAWINGS

Features and advantages of the present invention will become more apparent from the following detailed description of exemplary embodiments thereof taken in conjunction with the accompanying drawings in which:

FIGS. 3 and 4 show examples of portions of a user interface of the FIG. 1 system.

FIGS. 5 and 6 show examples of processing platforms that may be utilized to implement at least a portion of the FIG. 1 system.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
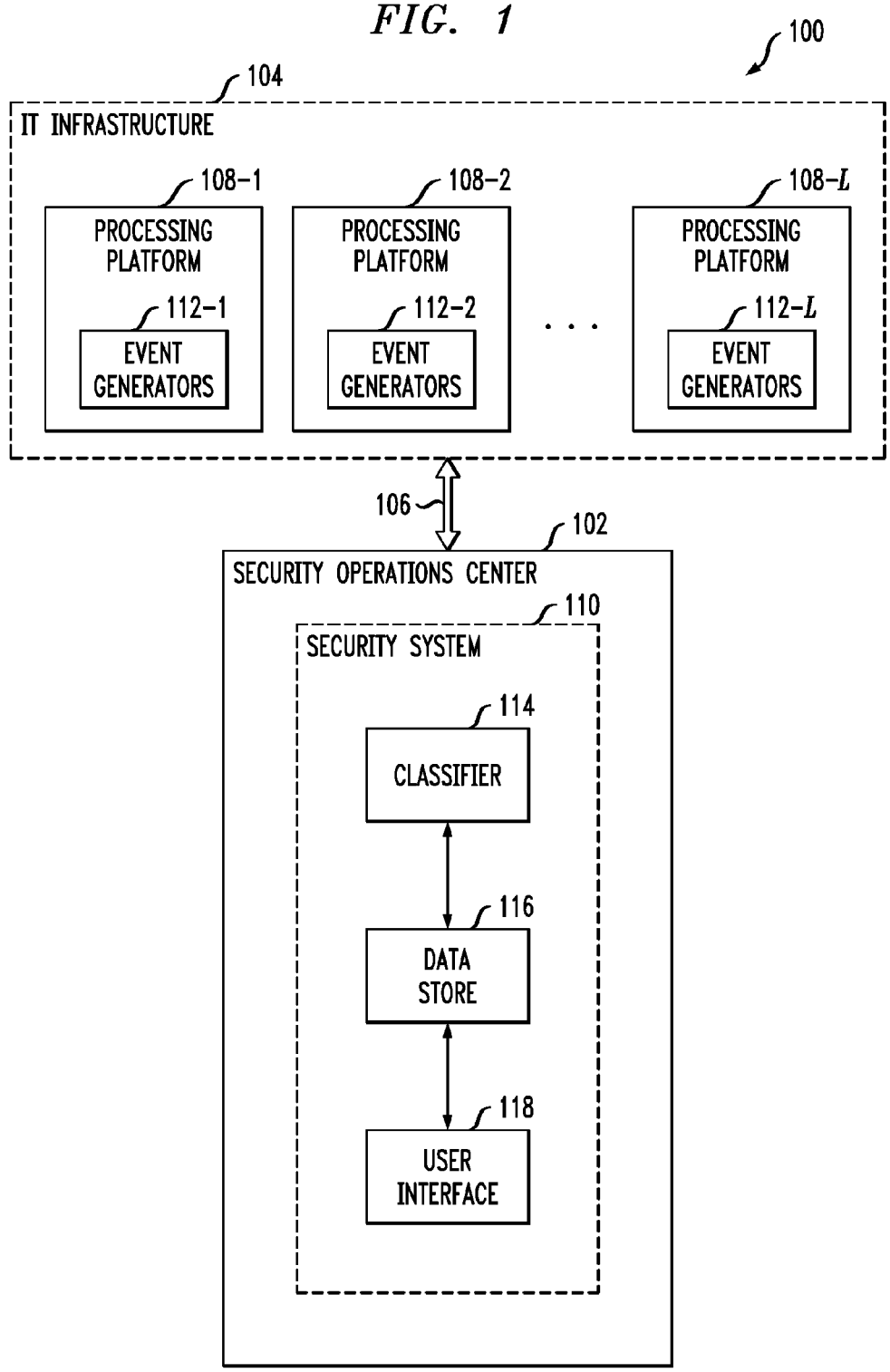
FIG. 1 shows an information processing system that incorporates learned riskiness functionality in an illustrative embodiment of the invention.

FIG. 1 shows an information processing system 100 configured in accordance with an illustrative embodiment of the invention. The system 100 in this embodiment comprises a security operations center (SOC) 102 coupled to information technology (IT) infrastructure 104 via one or more network connections 106. The SOC 102 generally provides monitoring and control functions for the IT infrastructure 104.

The IT infrastructure 104 comprises a plurality of processing platforms 108-1, 108-2, . . . 108-L, each of which may comprise a different set of one or more computers, servers, storage devices or other processing devices, in any combination. Examples of processing platforms that may form portions of the IT infrastructure 104 in system 100 will be described in more detail below in conjunction with FIGS. 5 and 6. Such processing platforms may comprise cloud infrastructure of a cloud service provider.

Portions of the SOC 102 may correspond to elements of an otherwise conventional Security Information and Event Management (SIEM) system, such as the enVision® platform commercially available from RSA, The Security Division of EMC Corporation of Hopkinton, Mass. Such an SIEM system may be fully centralized. A centralized SIEM system collects raw log information from monitored remote applications of an enterprise environment, and uses the collected raw log information to build a comprehensive database of application activity. The system subsequently performs correlations on the data stored in the database to determine, for example, if specified patterns are found.

It is also possible for an SIEM system to be at least partially distributed, as disclosed in U.S. patent application Ser. No. 12/982,288, filed Dec. 30, 2010 and entitled "Distributed Security Information and Event Management System with Application-Injected Remote Components," which is commonly assigned herewith and incorporated by reference herein. Embodiments disclosed therein provide a distributed SIEM system that comprises a centralized portion and a plurality of remote portions, with the remote portions being implemented in respective applications within information technology infrastructure. Each of the remote portions comprises one or more remote components inserted into the corresponding application. At least a subset of the remote components of the remote portion are configured for interaction with one or more corresponding centralized components of the centralized portion of the system. In such an arrangement, remote components of the SIEM system may be injected directly into applications running on servers or other types of information technology infrastructure, which may comprise distributed virtual infrastructure. The distributed STEM system is therefore more scalable, more responsive and more autonomic than the conventional centralized SIEM system.

The system 100 further comprises a security system 110 that processes security-related events generated by sets of event generators 112-1, 112-2, . . . 112-L implemented in respective processing platforms 108-1, 108-2, . . . 108-L of the IT infrastructure 104. The system 110 comprises a classifier 114 configured to process information characterizing the events in order to generate respective risk scores, and a data store 116 coupled to the classifier 114 and configured to store feedback regarding the risk scores.

As will be described in greater detail below, the classifier 114 and other classifiers in other embodiments disclosed herein are generally configured to utilize the feedback regarding the risk scores to learn riskiness of particular events and to adjust their operation based on the learned riskiness, such that the risk score generated by the classifier for a given one of the events is based at least in part on the feedback received regarding risk scores generated for one or more previous ones of the events.

The classifier 114 may be configured to implement a machine learning algorithm that adjusts risk scores generated for future events based on the feedback regarding risk scores generated for previous events. Such a machine learning algorithm in the present embodiment is assumed to comprise a naïve Bayes classification algorithm, although other types of machine learning algorithms may be used in other embodiments, such as a support vector machine (SVM) algorithm.

The system 110 in the present embodiment further comprises a user interface 118 through which a user is presented with information regarding the events and their associated risk scores and is provided with an ability to supply feedback regarding the risk scores. For example, the user interface 118 may be configured to allow the user to identify a particular event and its associated risk score as being one of a false positive and a true positive, although numerous other types of feedback may be used as will be described in further detail below. Portions of an exemplary user interface 118 in the form of screen shots presented to a user will be described in greater detail below in conjunction with FIGS. 3 and 4.

Other types and arrangements of one or more processing modules may be used to implement the system 110 in other embodiments of the invention. For example, although shown as being implemented entirely within the SOC 102 in the present embodiment, portions of the system 110 in other embodiments may be implemented at least in part in other system elements, such as within the IT infrastructure 104. Also, elements such as event generators 112 which are shown as being part of the processing platforms 108 in the present embodiment may alternatively be implemented at least in part within the SOC 102.

The SOC 102 or portions thereof may be implemented utilizing one or more processing devices. A given such processing device generally comprises at least one processor and an associated memory, and includes one or more functional modules for controlling certain features of the system 100.

The processor in a processing device of this type may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. The memory and other memories disclosed herein may be viewed as examples of what are more generally referred to as "computer program products" storing executable computer program code.

In addition to a processor and a memory, a processing device will generally include a variety of other types of circuitry, such as network interface circuitry that allows the processing device to communicate with other processing devices over one or more networks. Such networks may include, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The network interface circuitry may comprise one or more conventional transceivers.

It is to be appreciated that the particular set of elements shown in FIG. 1 for learning riskiness of security-related events involving IT infrastructure 104 is presented by way of example, and in other embodiments additional or alternative elements may be used. Thus, another embodiment may include additional sets of processing devices or other types and configurations of IT infrastructure and associated SOC and system components.

As mentioned previously, various elements of system 100 such as computers, servers, storage devices or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, servers, storage devices or other types of processing devices.

It was described above that the system 100 in the present embodiment implements a process for learning riskiness of security-related events relating to the IT infrastructure 104. An example of such a process performed utilizing particular components of system 100 will be described in conjunction with FIG. 2, but it is to be appreciated that numerous other types of processes may be used in other embodiments.

Figure 2:
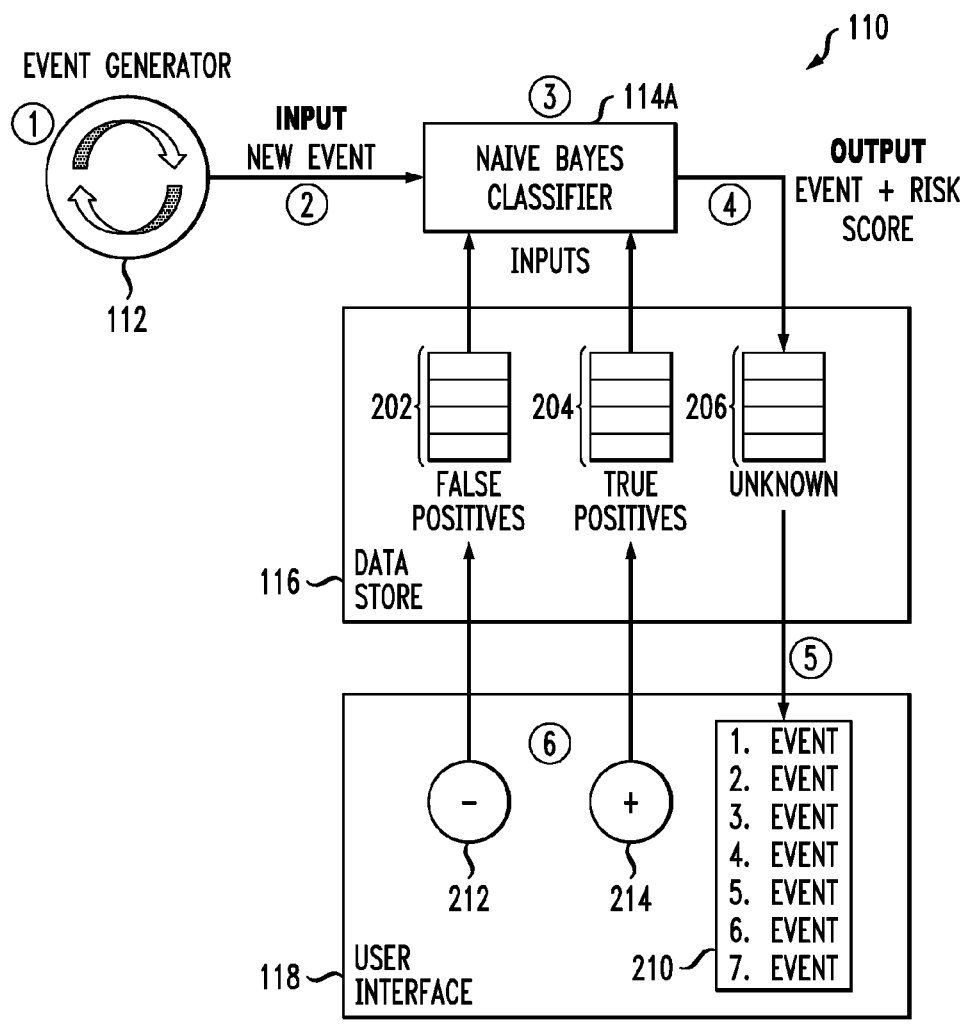
FIG. 2 is a flow diagram of a process for learning riskiness of security-related events in the information processing system of FIG. 1.

FIG. 2 illustrates the processing of security-related events in the information processing system 100, using learned riskiness functionality. In this embodiment, classifier 114 is more particularly implemented as a naïve Bayes classifier 114A, although as indicated above other types of classifiers can be used in other embodiments. The data store 116 includes a first set of storage locations 202 for storing information identifying events characterized by user feedback as false positives, a second set of storage locations 204 for storing information identifying events characterized by user feedback as true positives, and a third set of storage locations 206 for storing information identifying events not yet characterized as false positives or true positives. The diagram of FIG. 2 as shown includes process steps denoted as 1 through 6, each of which is described in greater detail below.

1. Event Generation. A given one of the event generators 112 generates one or more new events. The event generator may comprise, for example, an event detection module coupled to, integrated in or otherwise associated with a product implemented within one or more of the processing platforms 108. Events may be generated based on rules or other triggers, such as a suspicious network connection, sensitive documents being emailed, or malware being detected. These events may be further processed to determine if company policies are being violated. This may involve the need for further investigation by security operators, administrators or other types of system users.

2. Event Input. Newly generated events are sent to the classifier 114A. A given "event" as the term is broadly used herein may include not only an event identifier, but also associated metadata characterizing the event. Such metadata may include, for example, an event source, source network address, target network address, time of day, location, user accounts, event type, device type, rules triggered, etc. An "incident" as that term is used herein is considered an example of a type of event.

3. Event Classification. The event and its associated metadata are processed in the naïve Bayes classifier 114A to classify the event as a true positive or a true negative, and to generate a corresponding risk score. The classifier uses previously-processed events and their associated metadata as a learning set.

4. Event Output. The output of the classifier is the event and the risk score. It should be appreciated that a higher risk score in the present embodiment generally equates to a higher priority event that the user would typically want to investigate prior to lower priority events. It should be noted that the risk score generated by the classifier 114A is not necessarily a quantitative numerical result, but could instead be a simple binary indicator, such as "important/not important." Numerous other types of risk scores could be used.

5. User Interface Display. In the user interface 118, a display includes an ordered event list 210 that is utilized to present multiple events to the user. The events are prioritized in terms of their respective risk scores. The display in the present embodiment therefore indicates the order in which the user should investigate the presented events. The list could show the risk scores, as in the embodiment of FIG. 3, or may include colors or other classification indicators specifying the riskiness of the corresponding events. In other embodiments, the risk scores could be combined with one or more other indicators in determining riskiness levels of the corresponding events.

6. User Feedback. After the user investigates a given high-priority event, the user can provide feedback by marking the event as a false positive or a true positive, using respective controls 212 and 214 that are part of the user interface 118. By way of example, an event that was listed in event list 210 but turned out not to violate policy or require further action is marked as a false positive by user actuation of the negative control 212. Similarly, an event that was listed in event list 210 and turned out to violate policy or require further action is marked as a true positive by user actuation of the positive control 214. When the user marks an event as a false positive or a true positive, this information is fed back to the appropriate respective storage locations 202 and 204 in the data store 116, so as to be made available to the classifier 114A in classifying subsequent events. This allows the classifier 114A to adjust its operation based on the learned riskiness.

The system 110 can also extract an implicit feedback from the user when the feedback from the user is not explicit or the event is not tagged as a true positive or false positive. The implicit feedback can relate to one or more attributes associated with an assessment of the risk scores by the user. The implicit feedback can also be provided to the classifier 114A such that it can adjust its operation. For example, the implicit feedback can relate to one or more of the following attributes associated with an assessment:

1. The time it takes the user to deal with the event during assessment. It should be appreciated that an irrelevant event is typically handled and removed quickly. Conversely, a significant security event is explored and investigated more thoroughly. It can, therefore, be deemed that the greater the time it takes to deal with the event during assessment the higher the probability of the event being significant.

2. The amount of data the user extracts from external systems during assessment of the event. It should be appreciated that irrelevant security events often do not require extensive data extraction. On the other hand, real security events can involve significant data enrichment. It can, therefore, be deemed that the greater the data extraction during assessment the higher the probability of the event being significant.

3. The amount of data added during assessment by the user in the form of free text commenting, structural data, etc. It can be deemed that the more data added during assessment the higher the probability of the event being significant.

4. Was the event aggregated or correlated to other security-related events during assessment of the event. It can be deemed that if the event was correlated with other events during assessment then there is a higher probability of the event being significant.

5. The seniority of the user that dealt with the event during assessment. It can be deemed that the higher the seniority of the user during assessment the higher the probability of the event being significant.
6. The amount of different users that handled the event during assessment. It can be deemed that the greater the number of users handling the event during assessment the higher the probability of the event being significant.
7. Was the event passed from user to another user or reviewed by multiple users during assessment. It can be deemed that the greater the number of users reviewing the event during assessment the higher the probability of the event being significant.
8. Was the event escalated during assessment. It can be deemed that if the event was escalated during assessment then there is a higher probability of the event being significant. The amount of time elapsed before escalation may also be relevant in determining the probability of the event being significant.
9. The amount of time that passed between the event firing time and the time it started to be assessed by a user. It can be deemed that the shorter the amount of time the higher the probability of the event being significant.
10. Was the event exported to other systems during assessment. It can be deemed that if the event was exported then the higher the probability of the event being significant.

It should be appreciated that the implicit feedback can relate to any one or more of the above attributes associated with assessment. Additionally, the implicit feedback can be provided to the classifier 114A such that the classifier can utilize the feedback to learn riskiness of particular events and to adjust its operation based on the learned riskiness.

Additionally, it should also be appreciated that the implicit feedback can be analyzed with respect to other similar events in a group. A group can be defined, as follows:
   Events dealt with by the same rule
   Events that belong to the same category
   Events that were fired in the same time frame
   Events that were fired for the same user or another entity (device, hostname, IP, etc.)

For example, it should be appreciated from the foregoing that if the handling time associated with the assessment of an event is significantly longer than the handling times associated with assessment of other events of the same group then the probability may increase of the event being a true positive. When this information is feed back into the classifier, this allows the classifier 114A to adjust its operation based on the deemed increased riskiness.

As a further example, it should also be appreciated from the foregoing that if the amount of data extracted for an event during assessment is significantly larger than amounts of extracted data for other alerts of the same group then it can increase the probability of it being a true positive. When this information is also feed back into the classifier, this allows the classifier 114A to adjust its operation based on the deemed increased riskiness.

Furthermore, it should be further understood that in at least one embodiment the aforementioned approach can be applied not only to single events (by itself or compared to other events) but also to event pairs, triples and so on. By a pair, we mean an event A followed by an event B. For example, the implicit feedback of connecting to black-listed external IP when it follows events of consecutive failed access requests may be significantly different from the feedback of the first event when it is a stand-alone event. The feature of event pairs and the like can allow for extracting finer feedback and better grasping the underlying knowledge of the user.

Moreover, it should be appreciated that the assessment of events will be done by a group of users each having their own characteristics such as accuracy, efficiency, quickness and so on. Therefore, the implicit feedback is heavily dependent on the professional knowledge of the users as well as their diligence. For example, if the users are poorly trained this can lead to negative learning. The variations between different users should be taken into consideration when extracting the implicit feedback in order to achieve an analyst-independent feedback. Some ways to tackle this issue are as follows:

After evaluating the raw implicit feedback it can be normalized per analyst. The assumption being that users on the same level should receive and investigate the same distribution of events which should result in a similar feedback score distribution. Hence, the following normalization is applied:

$$\text{Score}_{Norm} = \frac{\text{Score}_{raw} - \text{Mean}(\text{Score}_{raw})}{STD(\text{Score}_{raw})}$$

The mean and standard deviation should be extracted over all the events assessed by a specific analyst over a pre-defined period.

In some cases, the explicit feedback is also available. It should be understood that a high correlation should exist between the implicit and explicit feedback such that a low correlation can indicate poor estimation of the implicit feedback score. Per each user, the confidence level is extracted as follows:

$$Conf = 1 - \frac{1}{N}\sqrt{\sum_i (\text{Feedback}_{explicit}(\text{Event}_i) - \text{Feedback}_{implicit}(\text{Event}_i))^2}$$

The sum should be over all the N events with explicit feedback of a specific user.

The confidence in the implicit feedback estimation can be higher when different users tend to assign similar implicit feedback scores to similar events (e.g., events that were fired by the same rule). Hence, the confidence estimation proposed above is multiplied by, for example, $$\text{Confidence}_{factor}(\text{Rule}_j) = 1 - \exp(-STD(\text{Mean}(\text{Feedback}_{implicit}(\text{Event}_i))))$$

The mean should be extracted over all the events that were fired by $\text{Rule}_j$ and investigated by a specific user, and the standard deviation should be calculated over all the means of the different users.

The particular processing operations and other system functionality described in conjunction with the flow diagram of FIG. 2 are presented by way of illustrative example only, and should not be construed as limiting the scope of the invention in any way. Alternative embodiments can use other types of processing operations for learning riskiness of security-related events in a system. For example, the ordering of the process steps may be varied in other embodiments, or certain steps may be performed concurrently with one another rather than serially. The steps of the FIG. 2 process are assumed to be implemented in a processing platform comprising at least one processing device having a processor coupled to a memory.

It is therefore to be appreciated that learned riskiness functionality such as that described in conjunction with the flow diagram of FIG. 2 can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

FIG. 3 shows a screen shot 300 of the user interface 118. In this embodiment, the user interface presents a list of detected events responsive to actuation of an incidents tab 302. In this context, and as indicated previously, an "incident" is considered an example of a type of security-related event as the latter term is broadly utilized herein. The events shown in the screen shot 300 are presented in order of decreasing learned riskiness, based on the corresponding ordered list of risk scores shown in column 304. As noted above, at least a subset of these risk scores are assumed to be determined based on feedback as processed by the classifier 114A.

The screen shot 300 also includes information specifying initial riskiness levels determined for the respective events without utilizing any feedback. This is the column of the display that indicates severity level, which shows certain events being associated with low, high and critical severity levels. The particular events listed are data loss prevention events as detected by a data loss prevention product, and include actions such as copying or moving of social security numbers and credit card numbers. Certain of these events are characterized by static rules of the data loss prevention product as being of low, high or critical severity, as indicated in the diagram. However, it can be seen from the diagram that the feedback-based learned riskiness risk scores deviate significantly from the severity levels that are specified using the static rules of the data loss prevention product.

It is apparent from this example that the static rules based classification has identified certain events, such as the critical severity item at the bottom of the severity column, that are not actually high priority events in terms of learned riskiness. Thus, the learned riskiness approach allows a security operator or other user to better focus their limited resources on the most serious threats.

FIG. 4 shows one example of a set of user feedback controls 400 within user interface 118 that are utilized to provide feedback in an illustrative embodiment. These feedback controls may be presented responsive to a user highlighting a given one of the events and then activating the Set Validity icon of the screen shot 300. In this embodiment, after activating the Set Validity icon of screen shot 300 for a particular selected event to bring up the set of user feedback controls 400, a user indicates that the particular event is a true positive by activating the "real issue" control. The user is alternatively permitted to designate the event as a false positive, or as a "non issue," using respective additional controls. It should also be appreciated the user can insert a 'comment' in the appropriate box. A wide variety of other types of user controls may be utilized to provide feedback regarding security-related events via the user interface 118.

As noted above, the classifier 114A is implemented as a naïve Bayes classifier in the present embodiment. Such a classifier may utilize as a set of input parameters for a given event at least a portion of the metadata associated with that event. These parameters are then used in a learning set of the classifier 114A.

It should be appreciated that for each event for which the user has explicity provided feedback in terms of identifying the event as a false positive or a true positive, or the system has implicitly determined the event as a false positive or a true positive, the probability of the corresponding parameters occurring is calculated. These calculated probabilities over multiple events for which feedback has been provided are used in the classification of new events generated in the system. For example, the classification of a new event may involve use of the following equation, where A denotes a true positive event and B denotes the corresponding parameters:

$$P(A \mid B) = \frac{P(B \mid A)P(A)}{P(B)}$$

This Bayesian probability equation determines the probability of a true positive event A given the parameters B of that event.

The results of Bayesian probability computations of the type described above are utilized by classifier 114A to assign a risk score to each new event to indicate how closely it resembles previous true positive events. A higher risk score will indicate that the corresponding new event is more likely to be a true positive event. The event list presented to the user can be ordered by decreasing risk score, as illustrated in the FIG. 3 embodiment, so as to allow the user to focus on the most risky events first.

Consider as an example a data loss prevention product that generates events indicating that credit card numbers are being sent over an HTTP connection to a web site such as Facebook. The data loss prevention product may indicate that such events have a high or critical severity level, as indicated in the screen shot 300 of FIG. 3, based on application of its static rules. However, in actuality, these numbers may not be credit card numbers at all, but may instead be Facebook user IDs. The system 110 addresses this situation by allowing a user to select the corresponding event in the screen shot 300, and indicate to the system whether the event is a false positive or a true positive. Alternatively, the user may not explicitly indicate a false positive or a true positive but may implicitly indicate the severity of the problem by the amount of time spent dealing with the matter. Based on either the explicit or implicit feedback, the risk scores generated by the classifier 114A for similar events will tend to fall, such that these events fall to lower positions in the event list presented to the user. Essentially, the system would learn that John Smith logs into Facebook.com during business hours every day, and that this event is not as risky as one in which Jane Doe sends a social security number to MySpace.com at 1:00 AM.

The embodiments described in conjunction with FIGS. 1-4 can provide a number of significant advantages relative to conventional practice. For example, the learned riskiness functionality leverages machine learning to allow a data loss prevention product or other security product to adapt to changing environments. As a result, users are provided with a greatly enhanced ability to identify the most important security-related events among a large number of such events that may be detected within the system. This considerably facilitates the effective implementation of data loss prevention techniques as well as a wide variety of other security protections.

Referring now to FIG. 5, portions of the information processing system 100 in this embodiment comprise cloud infrastructure 500. The cloud infrastructure 500 comprises virtual machines (VMs) 502-1, 502-2, . . . 502-M implemented using a hypervisor 504. The hypervisor 504 runs on physical infrastructure 505. The cloud infrastructure 500 further comprises sets of applications 510-1, 510-2, . . . 510-M running on respective ones of the virtual machines 502-1, 502-2, . . . 502-M under the control of the hypervisor 504. The cloud infrastructure 500 may be viewed as providing an example of what is more generally referred to herein as "virtual infrastructure." The cloud infrastructure 500 may encompass the entire system 100 or only portions of that system, such as the IT infrastructure 104.

Although only a single hypervisor 504 is shown in the embodiment of FIG. 5, the system 100 may of course include multiple hypervisors each providing a set of virtual machines using at least one underlying physical machine.

An example of a commercially available hypervisor platform that may be used to implement hypervisor 504 and possibly other portions of the IT infrastructure 104 of information processing system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the IT infrastructure of system 100.

As indicated previously, the system 100 may be implemented using one or more processing platforms. One or more of the processing modules or other components of system 100 may therefore each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of the system 100 and includes a plurality of processing devices, denoted 602-1, 602-2, 602-3, . . . 602-K, which communicate with one another over a network 604. The network 604 may comprise any type of network, such as a WAN, a LAN, a satellite network, a telephone or cable network, or various portions or combinations of these and other types of networks.

The processing device 602-1 in the processing platform 600 comprises a processor 610 coupled to a memory 612. The processor 610 may comprise a microprocessor, a microcontroller, an ASIC, an FPGA or other type of processing circuitry, as well as portions or combinations of such circuitry elements, and the memory 612, which may be viewed as an example of a "computer program product" having executable computer program code embodied therein, may comprise RAM, ROM or other types of memory, in any combination.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

Multiple elements of information processing system 100 may be collectively implemented on a common processing platform of the type shown in FIG. 5 or 6, or each such element may be implemented on a separate processing platform.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, IT infrastructure and processing device configurations, security systems and associated processes, classifiers, and machine learning algorithms. Numerous other alternative embodiments within the scope of the appended claims will be readily apparent to those skilled in the art.

What is claimed is:
1. An apparatus comprising:
at least one processing device comprising a processor coupled to a memory and implementing a security system, the security system comprising:
a classifier configured to process information characterizing an event in order to generate a risk score;
a data store coupled to the classifier and configured to store feedback relating to an assessment of the risk score by an assessor; and
an extractor for extracting implicit feedback from the stored feedback, wherein the implicit feedback describes non-explicit feedback regarding the risk score that does not include an express indication by the assessor of whether the risk score relates to one of a true positive or a false positive, further wherein the implicit feedback relates to one or more attributes of the assessment of the risk score by the assessor;
wherein the classifier is configured to utilize the implicit feedback regarding the risk score to learn riskiness of the event and to adjust its operation based on the learned riskiness, such that the risk score generated by the classifier for a future event is based at least in part on the implicit feedback.
2. The apparatus as claimed in claim 1, wherein the security system further comprises a user interface through which the assessor is presented with information regarding the events and their associated risk scores.
3. The apparatus as claimed in claim 2, wherein the user interface is configured to allow the assessor to identify a particular event and its associated risk score for assessment.
4. The apparatus as claimed in claim 3, wherein the data store is configured to store feedback relating to the time expended by the assessor during assessment of the risk score.
5. The apparatus as claimed in claim 3, wherein the data store is configured to store feedback relating to the amount of data extracted from external systems by the assessor during assessment of the risk score.

6. The apparatus as claimed in claim 3, wherein the data store is configured to store feedback relating to the amount of data added by the assessor during assessment of the risk score.

7. The apparatus as claimed in claim 3, wherein the data store is configured to store feedback relating to the seniority of the assessor assessing the risk score during assessment of the risk score.

8. The apparatus as claimed in claim 3, wherein the data store is configured to store feedback relating to whether the identified particular event and its associated risk score have been referred to another assessor for further assessment.

9. The apparatus as claimed in claim 3, wherein the data store is configured to store feedback relating to the number of assessors assessing the risk score during assessment of the risk score.

10. The apparatus as claimed in claim 1, wherein the classifier implements a machine learning algorithm that adjusts risk scores generated for future events based on the feedback generated for previous events.

11. The apparatus as claimed in claim 10, wherein the machine learning algorithm comprises a naïve Bayes classification algorithm.

12. The apparatus as claimed in claim 10, wherein the machine learning algorithm comprises a support vector machine algorithm.

13. A method comprising the steps of:
processing information characterizing a security-related event in order to generate a risk score;
receiving feedback relating to one or more attributes associated with an assessment of the risk score by an assessor;
extracting implicit feedback from the received feedback, wherein the implicit feedback describes non-explicit feedback regarding the risk score that does not include an express indication by the assessor of whether the risk score relates to one of a true positive or a false positive, further wherein the implicit feedback relates to one or more attributes of the assessment of the risk score by the assessor; and
utilizing the implicit feedback regarding the risk score to learn riskiness of the event and to adjust its operation based on the learned riskiness, such that the risk score generated for a future event is based at least in part on the implicit feedback;
wherein at least one of the steps is performed by a hardware processor.

14. An information processing system comprising:
information technology infrastructure;
a security operations center associated with the information technology infrastructure and comprising a security system, the security system comprising:
a classifier configured to process information characterizing an event in order to generate a risk score;
a data store coupled to the classifier and configured to store feedback relating to an assessment of the risk score by an assessor; and
an extractor for extracting implicit feedback from the stored feedback, wherein the implicit feedback describes non-explicit feedback regarding the risk score that does not include an express indication by the assessor of whether the risk score relates to one of a true positive or a false positive, further wherein the implicit feedback relates to one or more attributes of the assessment of the risk score by the assessor;
wherein the classifier is configured to utilize the implicit feedback regarding the risk score to learn riskiness of the event and to adjust its operation based on the learned riskiness, such that the risk score generated by the classifier for a future event is based at least in part on the implicit feedback;
characterized in that the security operations center is at least partly implemented by a hardware processor.

* * * * *